(12) United States Patent
Paczkowski

(10) Patent No.: US 12,294,924 B2
(45) Date of Patent: *May 6, 2025

(54) DISTRIBUTED LEDGER CONTROL OVER WIRELESS NETWORK SLICES

(71) Applicant: T-MOBILE INNOVATIONS LLC, Overland Park, KS (US)

(72) Inventor: Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,369

(22) Filed: May 9, 2023

(65) Prior Publication Data
US 2023/0276213 A1 Aug. 31, 2023

Related U.S. Application Data

(63) Continuation of application No. 17/519,035, filed on Nov. 4, 2021, now Pat. No. 11,683,672.

(51) Int. Cl.
*H04W 4/50* (2018.01)
*H04W 4/24* (2018.01)
*H04W 48/18* (2009.01)

(52) U.S. Cl.
CPC ............ *H04W 4/50* (2018.02); *H04W 4/24* (2013.01); *H04W 48/18* (2013.01)

(58) Field of Classification Search
CPC ......... H04W 4/50; H04W 4/24; H04W 48/18; H04W 24/02; H04L 12/14; H04M 15/57; H04M 15/61; H04M 15/62

USPC ........................................................ 455/406
See application file for complete search history.

(56) References Cited

U.S. PATENT DOCUMENTS

| | | | |
|---|---|---|---|
| 9,332,422 | B2 | 5/2016 | Bai et al. |
| 10,129,108 | B2 | 11/2018 | Vrzic |
| 10,299,128 | B1 | 5/2019 | Suthar et al. |
| 10,361,843 | B1 | 7/2019 | Suthar et al. |
| 10,616,324 | B1 | 4/2020 | Kaddoura |
| 10,931,829 | B1 | 2/2021 | Paczkowski et al. |
| 11,216,788 | B1 | 1/2022 | Vijayaraghavan |
| 2017/0164349 | A1 | 6/2017 | Zhu et al. |
| 2017/0332421 | A1 | 11/2017 | Sternberg et al. |
| 2018/0082043 | A1 | 3/2018 | Witchey et al. |
| 2018/0343266 | A1 | 11/2018 | Lotter et al. |
| 2019/0095995 | A1 | 3/2019 | Rohlfs |

(Continued)

FOREIGN PATENT DOCUMENTS

| | | |
|---|---|---|
| WO | 2018136059 A1 | 7/2018 |
| WO | 2019045737 A1 | 3/2019 |
| WO | 2019070619 A1 | 4/2019 |

*Primary Examiner* — Huy C Ho

(57) ABSTRACT

A wireless communication network executes a smart contract in distributed ledger circuitry and responsively instantiates a wireless network slice for a wireless communication device. The wireless communication network transfers user data for the wireless communication device over the wireless network slice and responsively transfers slice usage data for the wireless communication device to the distributed ledger circuitry. The wireless communication network executes the smart contract in the distributed ledger circuitry and responsively stores the slice usage data for the wireless communication device in the distributed ledger circuitry.

13 Claims, 10 Drawing Sheets

(56) References Cited

U.S. PATENT DOCUMENTS

| | | |
|---|---|---|
| 2019/0251555 A1 | 8/2019 | McCormick et al. |
| 2020/0057860 A1 | 2/2020 | Patil et al. |
| 2020/0145221 A1 | 5/2020 | Chao et al. |
| 2021/0195421 A1* | 6/2021 | Marquardt ............ H04L 63/062 |

* cited by examiner

DISTRIBUTED LEDGER CONTROL OVER WIRELESS NETWORK SLICES

RELATED CASES

This United States patent application is a continuation of U.S. patent application Ser. No. 17/519,035 that was filed on Nov. 4, 2021 and is entitled "DISTRIBUTED LEDGER CONTROL OVER WIRELESS NETWORK SLICES." U.S. patent application Ser. No. 17/519,035 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores.

The wireless network elements comprise Interworking Functions (IWFs), Access and Mobility Management Functions (AMFs), Session Management Functions (SMFs), User Plane Functions (UPFs), and the like. Some of the network elements are grouped into wireless network slices to deliver data communication services that feature low-latency, high-bandwidth, or some other service quality. For example, a UPF in a wireless network slice may be optimized for the user application that is served by the slice. Application Server Functions (ASFs) and Internet Protocol Multimedia Subsystem (IMS) servers are also optimized for user applications and wireless network slices. Some wireless network elements generate usage data for their wireless network slices and transfer the usage data to accounting servers. Some of the wireless network elements generate performance data for their wireless network slices and transfer the performance data to element management systems.

In a distributed ledger, a blockchain comprises a series of data blocks that store transactional information like account balances and title ownership. The blockchain is hosted by multiple geo-diverse ledger nodes that each execute a replicated contract to store identical contract results in redundant data blocks. The redundant data blocks in the blockchain are linked to one another by each data blocks storing a hash of the previous data block. Unfortunately, blockchains are not effectively integrated within wireless communication networks. Moreover, the wireless communication networks do not efficiently control the wireless network slices with the blockchains.

TECHNICAL OVERVIEW

In some examples, a wireless communication network executes a smart contract and responsively instantiates a wireless network slice for a wireless communication device. The wireless communication network transfers user data for the wireless communication device over the wireless network slice and responsively transfers slice usage data for the wireless communication device to the smart contract. The wireless communication network executes the smart contract and responsively stores the slice usage data for the wireless communication device.

In some examples, a wireless communication network serves a wireless communication device over a wireless network slice using one or more distributed ledger nodes. The one or more distributed ledger nodes transfer a slice request for the wireless communication device to a network orchestrator. The network orchestrator instantiates the wireless network slice for the wireless communication device responsive to the slice request. The wireless network slice transfers user data for the wireless communication device and responsively transfers slice usage data for the wireless communication device to the one or more distributed ledger nodes. The one or more distributed ledger nodes store the slice usage data for the wireless communication device.

DETAILED DESCRIPTION

Figure 1:
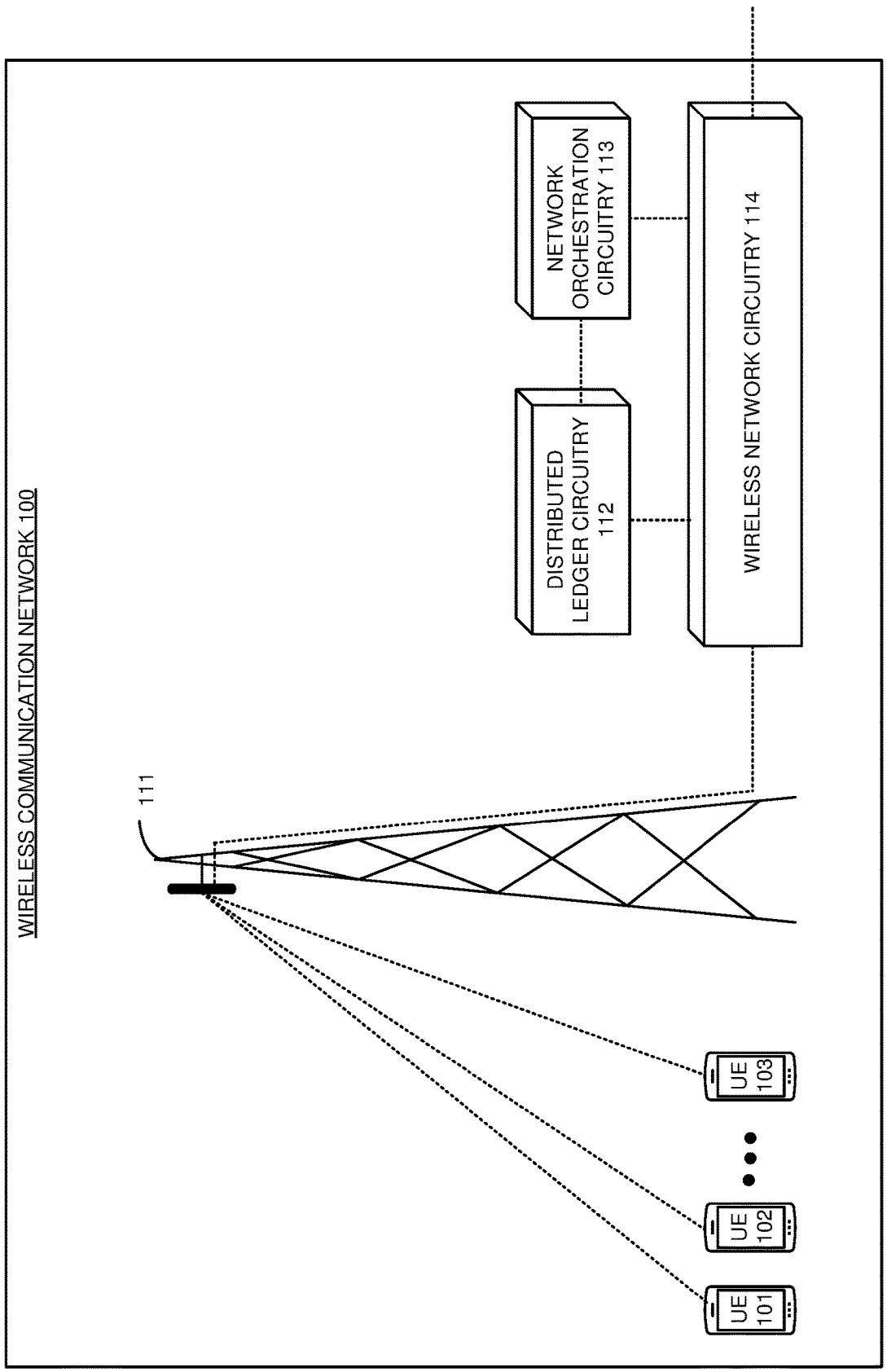
FIG. 1 illustrates an exemplary wireless communication network to serve User Equipment (UEs) over a wireless network slice controlled by distributed ledger circuitry.

FIG. 1 illustrates exemplary wireless communication network 100 to serve User Equipment (UEs) 101-103 over a wireless network slice controlled by distributed ledger circuitry 112. Wireless communication network 100 comprises UEs 101-103, wireless access node 111, distributed ledger circuitry 112, network orchestration circuitry 113, and wireless network circuitry 114. UEs 101-103 comprise computers, phones, vehicles, sensors, robots, or some other data appliance with data communication circuitry. Exemplary wireless data services include machine-control, internet-access, media-streaming, social-networking, and/or some other networking product. Wireless communication network 100 is simplified for clarity and typically includes more UEs, access nodes, and slices than shown.

Various examples of network operation and configuration are described herein. In some examples, distributed ledger circuitry 112 executes a contract from an origin block and responsively transfers an instantiation request for a wireless network slice to network orchestration circuitry 113. Network orchestration circuitry 113 instantiates the wireless network slice in wireless network circuitry 114 responsive to the instantiation request from distributed ledger circuitry 112. The wireless network slice delivers a wireless network service to UEs 101-103 and responsively transfers slice usage data for the wireless network slice to distributed ledger circuitry 112. For example, a wireless network slice that comprises a User Plane Function (UPF), Application Server (AS), Internet Protocol Multimedia Subsystem (IMS), or some other network element may deliver the wireless network service and transfer the slice usage data to distributed ledger circuitry 112. Distributed ledger circuitry 112 executes the contract from middle blocks and a termination block to form a blockchain that stores the slice usage data for the wireless network slice. Distributed ledger circuitry 112 transfers a termination request for the wireless network slice to network orchestration circuitry 113 responsive to executing the contract from the termination block. Network orchestration circuitry 113 terminates the wireless network slice responsive to the termination request from distributed ledger circuitry 112.

In some examples, distributed ledger circuitry 112 executes a new contract from a new origin block of a new blockchain in response to executing the contract from the termination block of the initial blockchain. Distributed ledger circuitry 112 transfers a new instantiation request for a new wireless network slice to network orchestration circuitry 113 in response to executing the new contract from the new origin block. Network orchestration circuitry 113 instantiates the new wireless network slice in wireless network circuitry 114 responsive to the new instantiation request from distributed ledger circuitry 112. In wireless network circuitry 114, the new wireless network slice delivers the wireless network service to UEs 101-103 and responsively transfers new slice usage data for the new wireless network slice to distributed ledger circuitry 112. Distributed ledger circuitry 112 executes the new contract from new middle blocks and a new termination block to form the new blockchain that stores the new slice usage data for the new wireless network slice. Distributed ledger circuitry 112 transfers a new termination request for the new wireless network slice to network orchestration circuitry 113 responsive to executing the new contract from the new termination block. Network orchestration circuitry 113 terminates the new wireless network slice in wireless network circuitry 114 responsive to the new termination request from distributed ledger circuitry 112.

In some examples, distributed ledger circuitry 112 stores a chain link that correlates the initial blockchain and the new blockchain. Distributed ledger circuitry 112 may transfer a digital certificate from the initial origin block of the initial blockchain to the new origin block of the new blockchain, so both blockchains share and are physically linked by the same digital certificate. Distributed ledger circuitry 112 may generate usage amounts for the wireless network slices based on the hashes of slice usage data in the termination blocks of the blockchains. Distributed ledger circuitry 112 may direct a network element like a Session Management Function (SMF) to transfer slice identifiers for the wireless network slices to Network Slice Selection Functions (NSSFs) and/or Unified Data Management (UDMs) responsive to executing the contracts from the origin blocks.

Advantageously, blockchains are effectively integrated within wireless communication network 100. Moreover, wireless communication network 100 efficiently controls wireless network slices with the blockchains.

UEs 101-103 and wireless access node 111 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. Wireless access node 111, circuitry 112-114, and external systems communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 101-103 and wireless access node 111 include radios. UEs 101-103, wireless access node 111, and circuitry 112-114 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
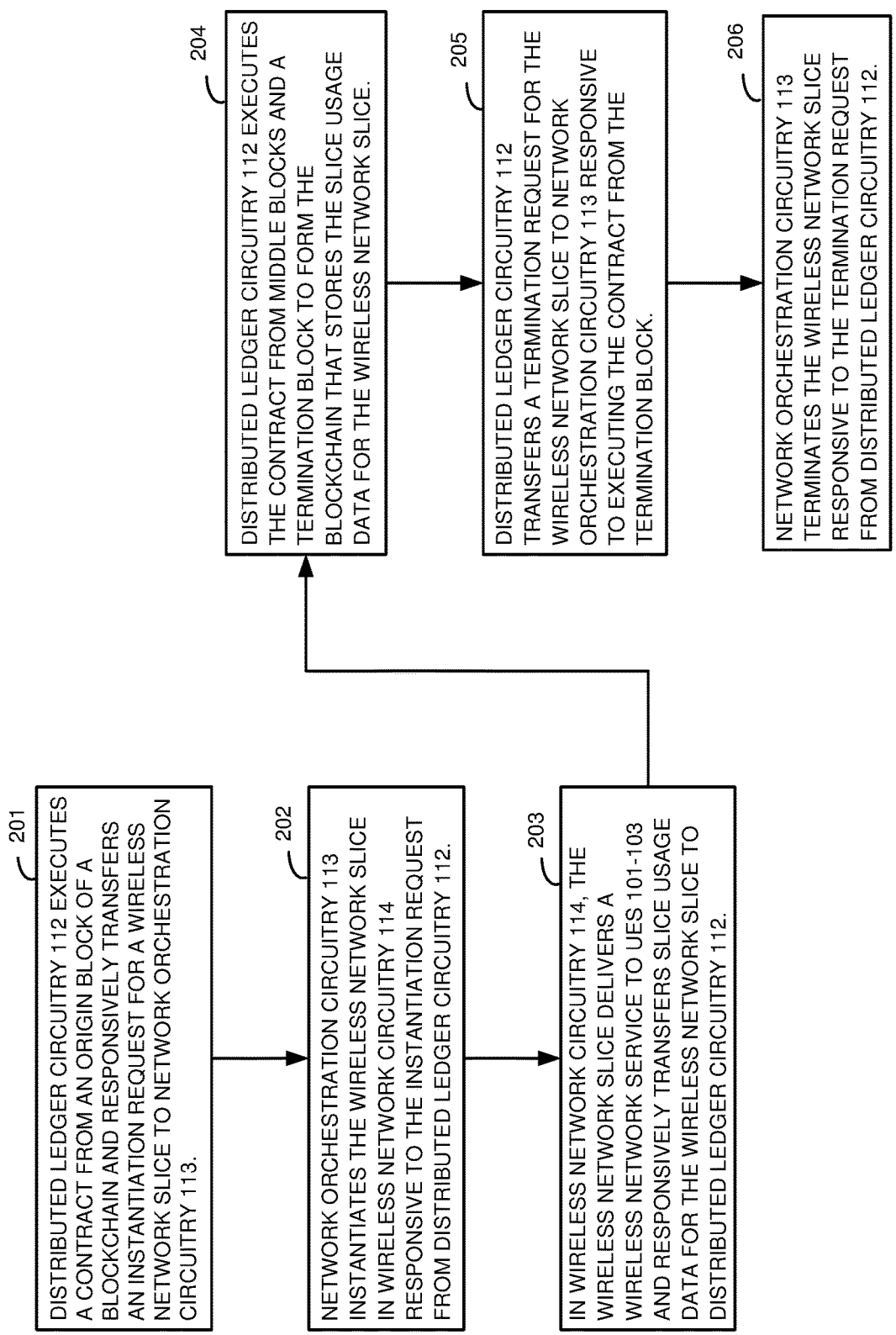
FIG. 2 illustrates an exemplary operation of the wireless communication network to serve the UEs over the wireless network slice controlled by the distributed ledger circuitry.

FIG. 2 illustrates an exemplary operation of wireless communication network 100 to serve UEs 101-103 over the wireless network slice by distributed ledger circuitry 112. The operation may vary in other examples. Distributed ledger circuitry 112 executes a contract from an origin block of a blockchain and responsively transfers an instantiation request for a wireless network slice to network orchestration circuitry 113 (201). Network orchestration circuitry 113 instantiates the wireless network slice in wireless network circuitry 114 responsive to the instantiation request from distributed ledger circuitry 112 (202). In wireless network circuitry 114, the wireless network slice delivers a wireless network service to UEs 101-103 and responsively transfers slice usage data for the wireless network slice to distributed ledger circuitry 112 (203). Distributed ledger circuitry 112 executes the contract from middle blocks and a termination block to form the blockchain that stores the slice usage data for the wireless network slice (204). Distributed ledger circuitry 112 transfers a termination request for the wireless network slice to network orchestration circuitry 113 responsive to executing the contract from the termination block (205). Network orchestration circuitry 113 terminates the wireless network slice responsive to the termination request from distributed ledger circuitry 112 (206).

Figure 3:
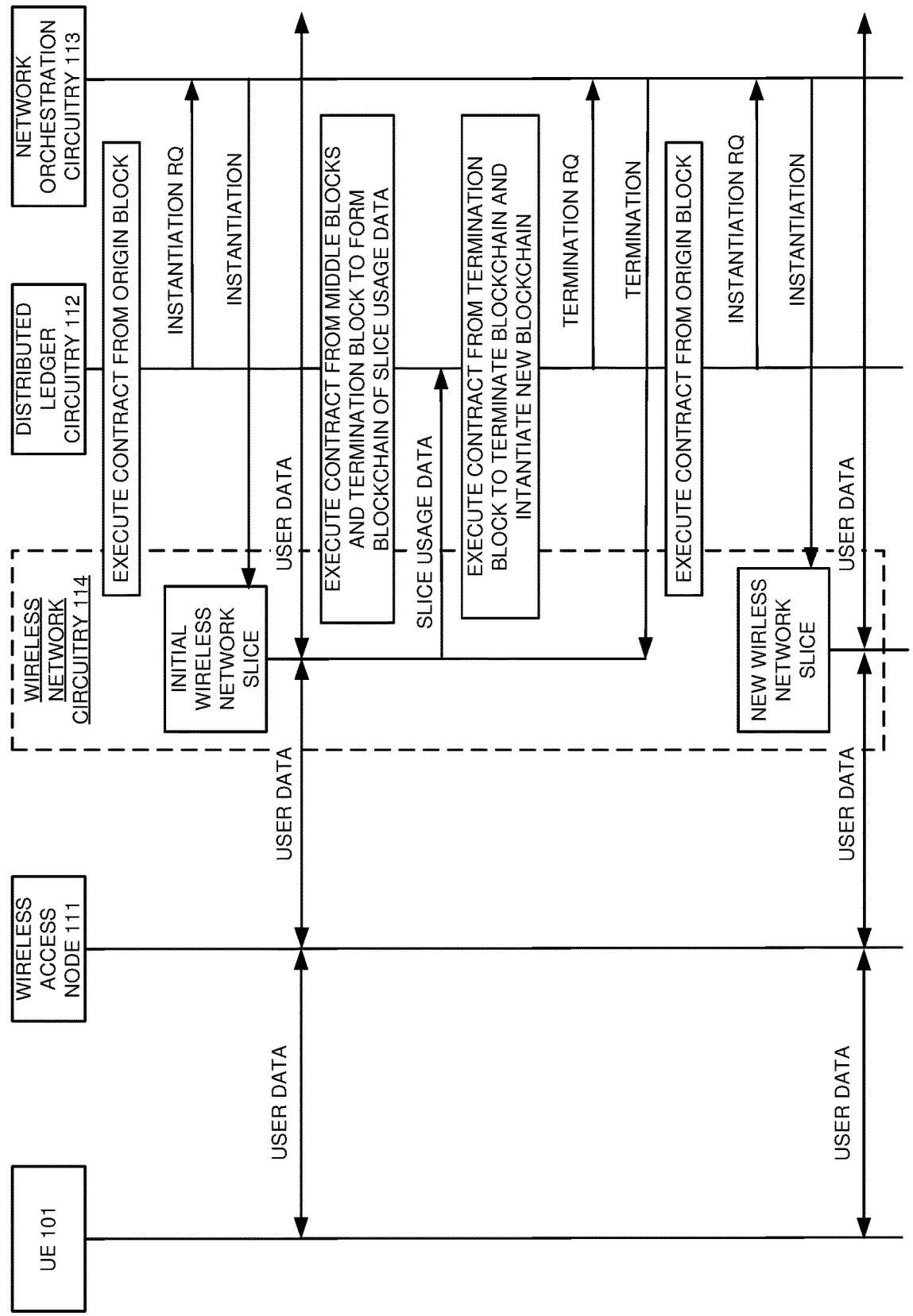
FIG. 3 illustrates an exemplary operation of the wireless communication network to serve the UEs over the wireless network slice controlled by the distributed ledger circuitry.

FIG. 3 illustrates an exemplary operation of the wireless communication network 100 to serve UEs 101-103 over the wireless network slice controlled by distributed ledger circuitry 112. The operation may vary in other examples. Distributed ledger circuitry 112 executes a contract from an origin block of an initial blockchain and responsively transfers an instantiation request for an initial wireless network slice to network orchestration circuitry 113. Network orchestration circuitry 113 instantiates the initial wireless network slice in wireless network circuitry 114 responsive to the instantiation request from distributed ledger circuitry 112. The initial wireless network slice exchanges user data with UEs 101-103 over wireless access node 111 and exchanges the user data with external systems. Distributed ledger circuitry 112 executes the contract from middle blocks and a termination block to form the initial blockchain that stores slice usage data for the initial wireless network slice. The initial wireless network slice transfers the slice usage data for the initial slice to distributed ledger circuitry 112. Distributed ledger circuitry 112 transfers a termination request for the initial wireless network slice to network orchestration circuitry 113 responsive to executing the contract from the termination block. Network orchestration circuitry 113 terminates the initial wireless network slice responsive to the termination request from distributed ledger circuitry 112.

Distributed ledger circuitry 112 executes a new contract from a new origin block of the new blockchain in response to executing the initial contract from the termination block of the initial blockchain. Distributed ledger circuitry 112 transfers a new instantiation request for a new wireless network slice to network orchestration circuitry 113 in response to executing the new contract from the new origin block. Network orchestration circuitry 113 instantiates the new wireless network slice in wireless network circuitry 114 in response to the new instantiation request. Distributed ledger circuitry 112 executes a new contract from an origin block of the new blockchain and responsively transfers a new instantiation request for the new wireless network slice to network orchestration circuitry 113. Network orchestration circuitry 113 instantiates the new wireless network slice in wireless network circuitry 114 responsive to the instantiation request from distributed ledger circuitry 112. The new wireless network slice exchanges user data with UEs 101-103 over wireless access node 111 and exchanges the user data with external systems, and the operation begins to repeat.

Figure 4:
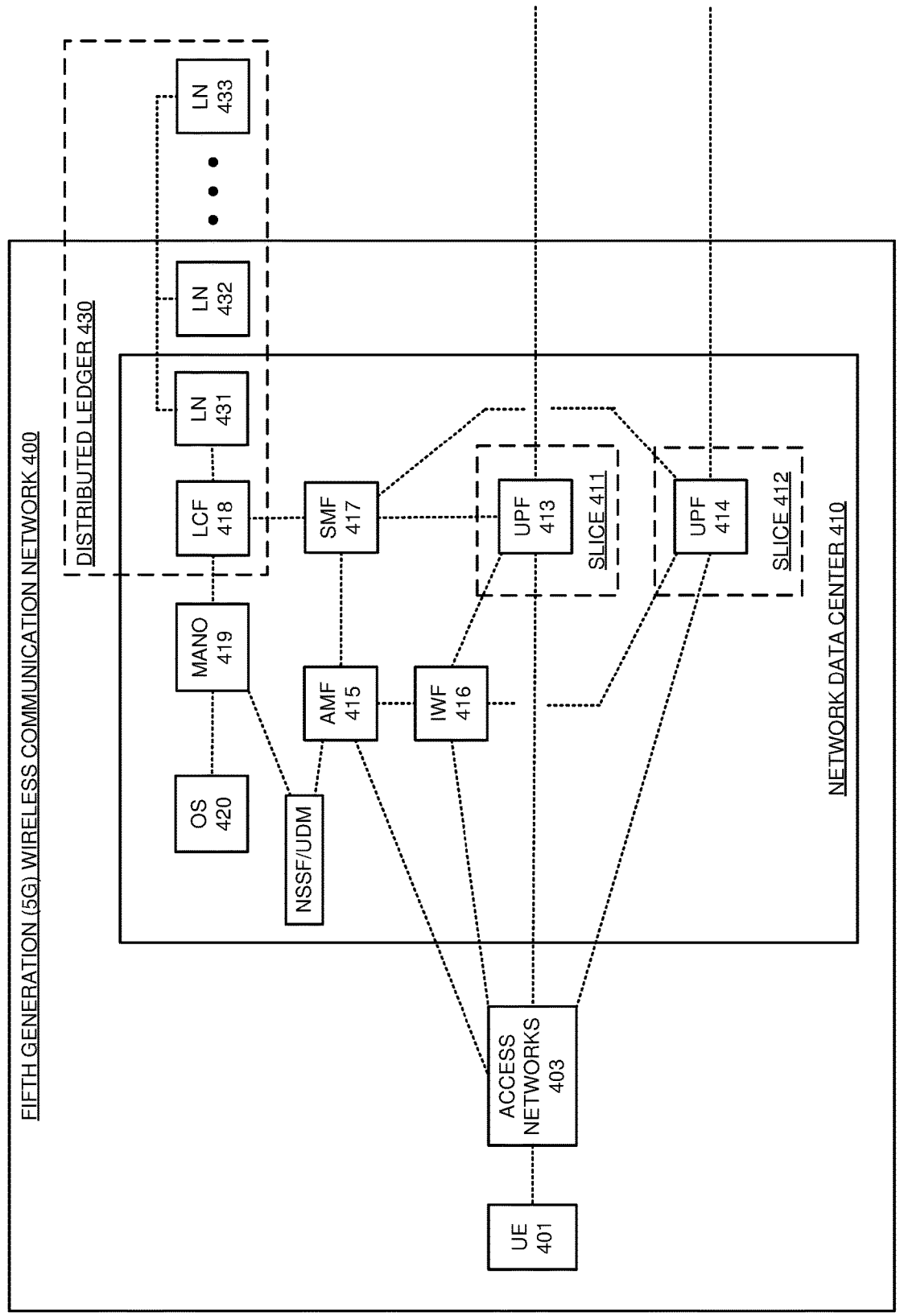
FIG. 4 illustrates an exemplary Fifth Generation (5G) wireless communication network to serve UEs over a wireless network slice controlled by a distributed ledger.

FIG. 4 illustrates an exemplary Fifth Generation (5G) wireless communication network 400 to serve UE 401 over wireless network slices 411-412 that are controlled by distributed ledger 430. 5G wireless communication network 400 comprises an example of wireless communication network 100, although network 100 may differ. 5G wireless communication network 400 comprises: UE 401, wireless access networks 403, network data center 410, and Ledger Node (LN) 432. Network data center 410 comprises wireless network slices 411-412, Access and Mobility Management Function (AMF) 415, non-Third Generation Partnership Project (non-3GPP) Interworking Function (IWF) 416, Session Management Function (SMF) 417, Ledger Control Function (LCF) 418, Management and Orchestration (MANO) 419, Operating Systems (OS) 420, and Ledger Node (LN) 431. Wireless network slices 411-412 comprise respective User Plane Functions (UPF) 413-414. Distributed ledger 430 comprises LCF 418, and LNs 431-433.

Initially, slices 411-412 and UPFs 413-414 are not yet instantiated. In distributed ledger 430, LNs 431-433 execute a contract from an origin block of a blockchain for slice 411. The origin block has a digital certificate and specifications for slice 411 and UPF 413. In response to contract execution, LN 431 directs LCF 418 to instantiate slice 411 and UPF 413 per the specifications. LCF 418 directs MANO 419 to instantiate slice 411 and UPF 413 per the specifications. MANO 419 directs OS 420 to instantiate slice 411 and UPF 413 per the specifications. OS 420 loads UPF 413 for execution per the specifications.

UE 401 attaches to one of access networks 403 and possibly IWF 416. UE 401 requests slice 411 from AMF 415 and AMF 415 interacts with the NSSF and/or UDM to authorize slice 411 for UE 401. AMF 415 signals SMF 417 to serve slice 411 per the specifications. SMF 417 signals UPF 413 to serve slice 411 to UE 401 per the specifications. UE 401 and UPF 413 exchange user data for slice 411 over access networks 403 and possibly IWF 416. UPF 413 transfers usage data for slice 411 to SMF 417. SMF 417 transfers the usage data for slice 411 to LCF 418. LCF 418 transfers the usage data for slice 411 to LN 431. LNs 431-433 execute the contract from middle blocks and a termination block to form the blockchain that stores the slice usage data for wireless network slice 411.

In response to executing the contract from the termination block, LN 431 transfers a termination request for wireless network slice 411 to LCF 418. LCF 418 transfers a termination request for wireless network slice 411 to MANO 419. LCF 418 may generate a usage amount for wireless network slice 411 based on the hash of slice usage data from the termination block of the blockchain for slice 411. MANO 418 transfers a termination request for wireless network slice 411 to OS 420. OS 420 unloads UPF 413 from execution. In response to executing the contract from the termination block, LN 431 also transfers an instantiation request for a new blockchain for slice 412 to LCF 418. LCF 418 transfers an instantiation request for the new blockchain for slice 412 to LN 431.

In distributed ledger 430, LCF 418 transfers the digital certificate from the origin block for slice 411 to the origin block for slice 412. LNs 431-433 obtain a new contract and specifications for the new blockchain for slice 412 from a slice-contract library. In response to new contract execution, LN 431 directs LCF 418 to instantiate slice 412 and UPF 414 per the specifications. LCF 418 directs MANO 419 to instantiate slice 412 and UPF 414 per the specifications. LCF 418 stores a chain link that correlates the blockchain for slice 411 with the blockchain for slice 412. MANO 419 directs OS 420 to instantiate slice 412 and UPF 414 per the specifications. OS 420 loads UPF 414 for execution per the specifications. MANO 419 configures the NSSF and/or UDM with discovery and contact information for slice 412. Network elements like AMF 415 discover new slice 412 from the NSSF and/or UDM. OS 420 instantiates slice 412 and loads UPF 414 for execution per the specifications.

UE 401 again attaches to one of access networks 403 and possibly IWF 416. UE 401 requests slice 412 from AMF 415 and AMF 415 interacts with the NSSF and/or UDM to authorize slice 412 for UE 401. AMF 415 signals SMF 417 to serve slice 412 per the specifications. SMF 417 signals UPF 414 to serve slice 412 to UE 401 per the specifications. UE 401 and UPF 414 exchange user data for slice 412 over access networks 403 and possibly IWF 416. UPF 414 transfers usage data for slice 412 to SMF 417. SMF 417 transfers the usage data for slice 412 to LCF 418. LCF 418 transfers the usage data for slice 412 to LN 431. LNs 431-433 execute the new contract from middle blocks and a termination block to form the blockchain that stores the new slice usage data for wireless network slice 412.

In response to executing the contract from the termination block, LN 431 transfers a termination request for wireless network slice 412 to LCF 418. LCF 418 transfers a termination request for wireless network slice 412 to MANO 419. MANO 419 transfers a termination request for wireless network slice 412 to OS 420. OS 420 unloads UPF 414 from execution. LCF 418 may generate a usage amount for wireless network slice 412 based on the hash of slice usage data from the termination block of the blockchain for slice 412. The process may continue with new slices and blockchains.

Figure 5:
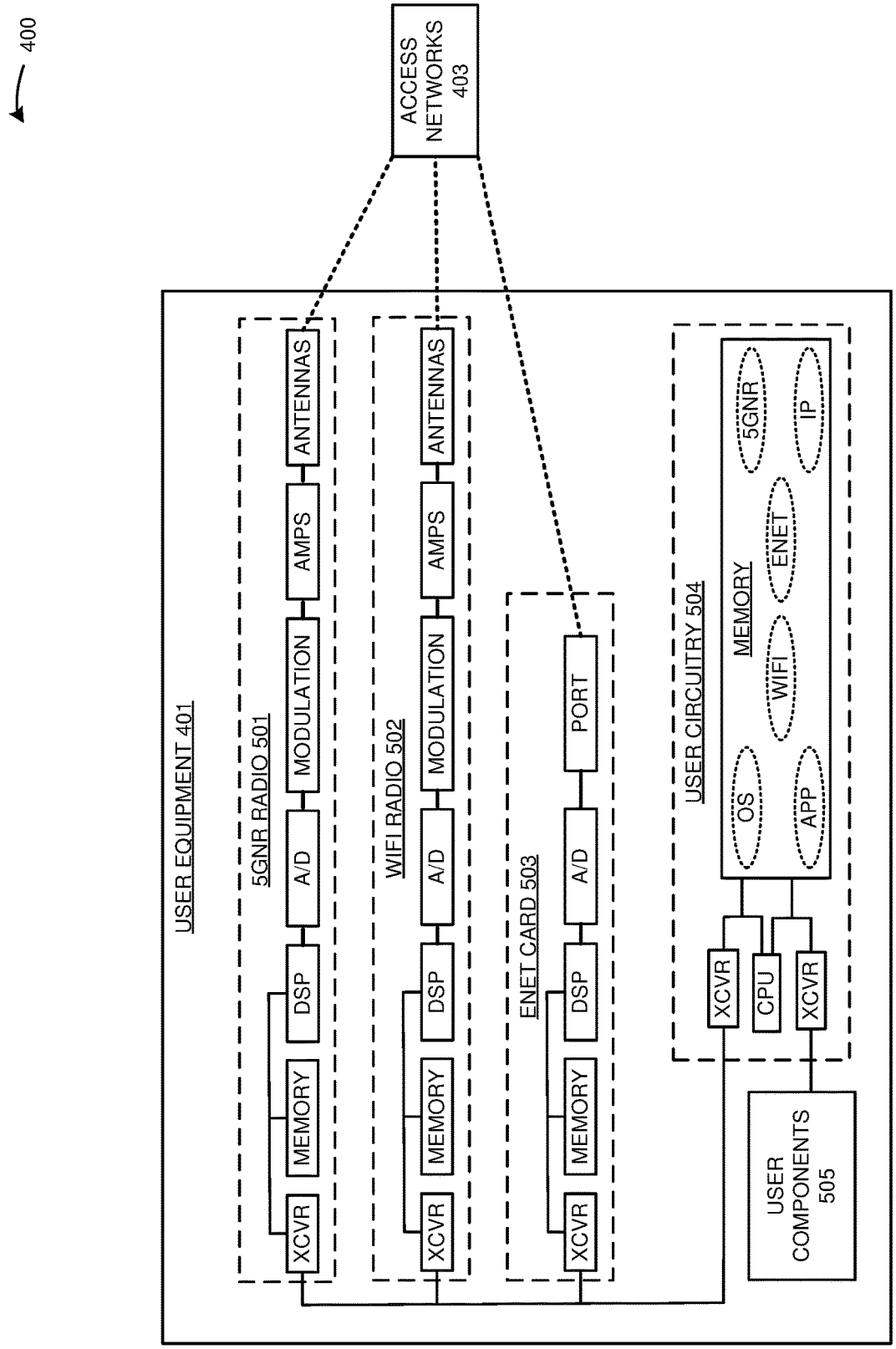
FIG. 5 illustrates an exemplary UE in the 5G wireless communication network.

FIG. 5 illustrates exemplary UE 401 in 5G wireless communication network 400. UE 401 comprises an example of UEs 101-103, although UEs 101-103 may differ. UE 401 comprises 5GNR radio 501, WIFI radio 502, Ethernet (ENET) card 503, user circuitry 504, and user components 505. User components 505 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. ENET card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system (OS), user applications (APP), and network applications for WIFI, ENET, 5GNR, and IP. The antennas in 5GNR radio 501 are wirelessly coupled to access networks 403 over a 5GNR link. The antennas in WIFI radio 502 are wirelessly coupled to access networks 403 over a WIFI link. The port in ENET card 503 is wireline coupled to access networks 403 over an Ethernet link. Transceivers (XCVRs) in radios 501-502 and card 503 are coupled to transceivers in user circuitry 504. Transceivers in user circuitry 504 are coupled to user components 505. The CPU in user circuitry 504 executes the operating system, user applications, and network applications to exchange network signaling and user data with router 410 over radios 501-502 and/or card 503. In some examples, some of the 5GNR, WIFI, and ENET components could be omitted. For example, the 5GNR and ENET portions could be omitted to form a WIFI-only UE. The 5GNR and WIFI portions could be omitted to form an ENET-only UE. The WIFI and ENET portions could be omitted to form a 5GNR-only UE. Other device combinations could be used like 5GNR/WIFI, 5GNR/ENET, and WIFI/ENET.

Figure 6:
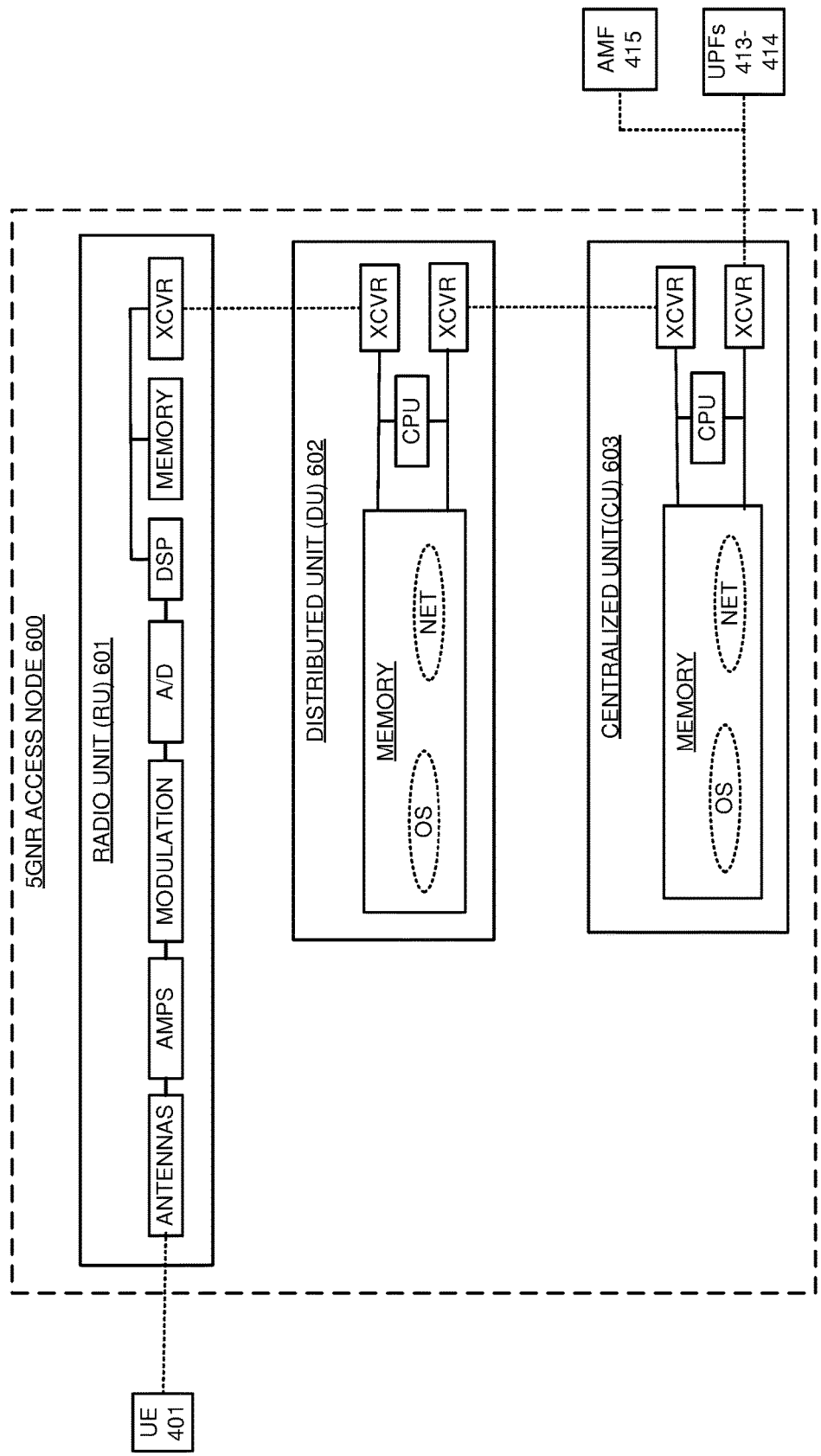
FIG. 6 illustrates an exemplary 5G New Radio (5GNR) access node in the 5G wireless communication network.

FIG. 6 illustrates exemplary 5G New Radio (5GNR) access node 600 in 5G wireless communication network 400. 5GNR access node 600 comprises an example of access networks 403, although networks 403 may differ. 5GNR access node 600 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system 604 and network applications for physical layer, media access control, and radio link control. CU 603 comprises memory, CPU, user interfaces and components, and transceivers that are coupled over bus circuitry. The memory in CU 603 stores an operating system and network applications for packet data convergence protocol, service data adaption protocol, and radio resource control. The antennas in RU 601 are wirelessly coupled to UE 401 over 5GNR links. Transceivers in RU 601 are coupled to transceivers in DU 602. Transceivers in DU 602 are coupled to transceivers in CU 603. Transceivers in CU 603 are coupled to AMF 415 and UPFs 413-414. The DSP and CPU in RU 601, DU 602, and CU 603 execute radio applications, operating systems, and network applications to exchange network signaling and user data with UE 401, AMF 415, and UPFs 413-414.

Figure 7:
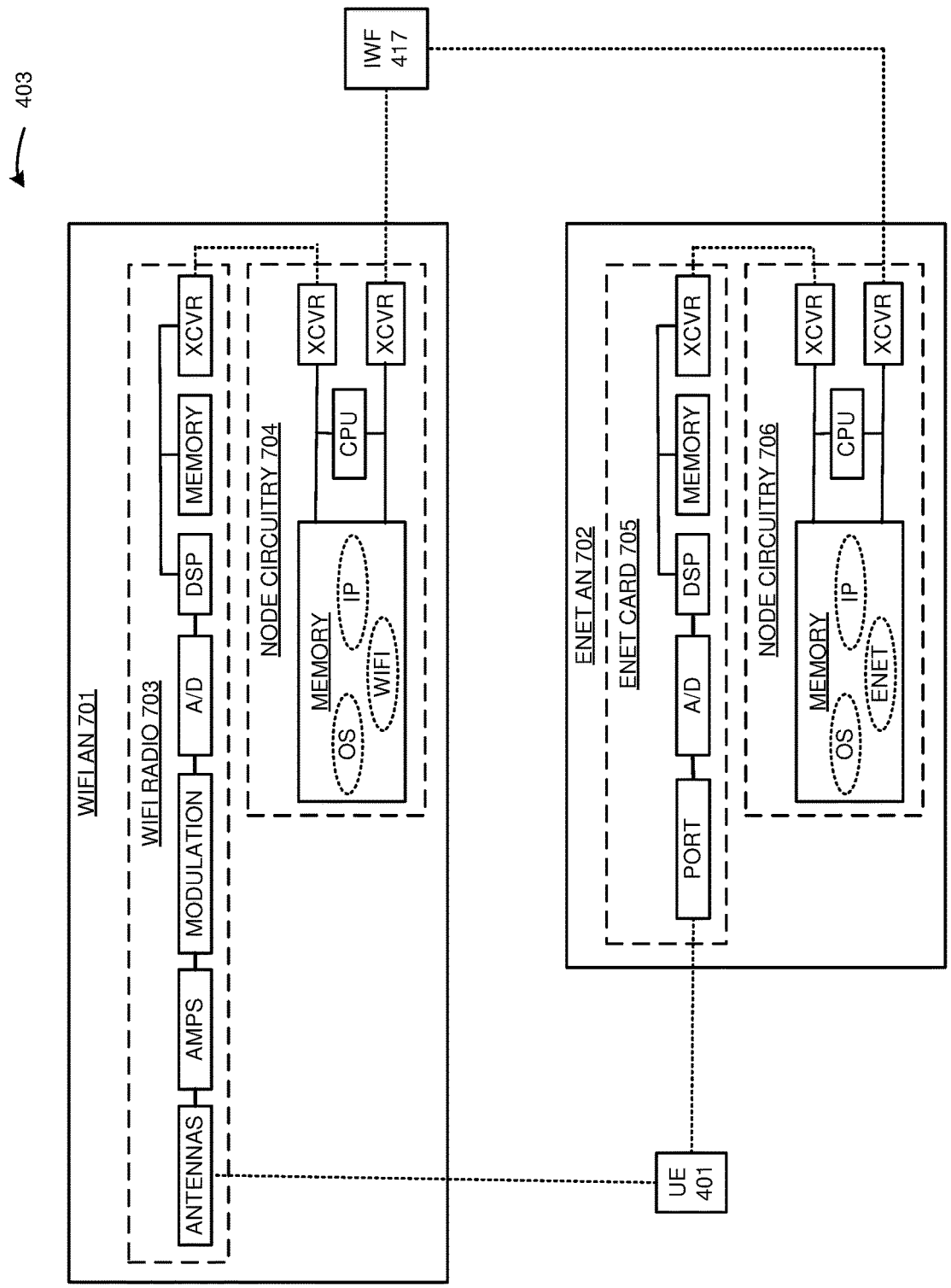
FIG. 7 illustrates exemplary non-3GPP access nodes in the 5G wireless communication network.

FIG. 7 illustrates exemplary non-3GPP access nodes 701-702 in 5G wireless communication network 400. Non-3GPP access nodes 701-702 comprise examples of access networks 403, although networks 403 may differ. WIFI AN 701 comprises WIFI radio 703 and node circuitry 704. WIFI radio 703 comprises antennas, amplifiers, filters, modulation, analog-to-digital interfaces, DSP, memory, and transceivers that are coupled over bus circuitry. Node circuitry 704 comprises memory, CPU, user interfaces and components, and transceivers that are coupled over bus circuitry. The memory in node circuitry 704 stores an operating system and network applications for IP and WIFI. The antennas in WIFI radio 704 are wirelessly coupled to UE 401 over a WIFI link. Transceivers in WIFI radio 703 are coupled to transceivers in node circuitry 704. Transceivers in node circuitry 704 are coupled to transceivers in IWF 412. The CPU in node circuitry 704 executes the operating system and network applications to exchange network signaling and user data with UE 401 and with IWF 416.

ENET AN 702 comprises ENET card 705 and node circuitry 706. ENET card 705 comprises ports, analog-to-digital interfaces, DSP, memory, and transceivers that are coupled over bus circuitry. Node circuitry 706 comprises memory, CPU, user interfaces and components, and transceivers that are coupled over bus circuitry. The memory in node circuitry 706 stores an operating system and network applications for IP and ENET. The ports in ENET card 705 are wireline coupled to UE 401 over an ENET link. Transceivers in ENET card 705 are coupled to transceivers in node circuitry 706. Transceivers in node circuitry 706 are coupled to transceivers in IWF 414. The CPU in node circuitry 706 executes the operating system and network applications to exchange network signaling and user data with UE 401 and with IWF 416.

Figure 8:
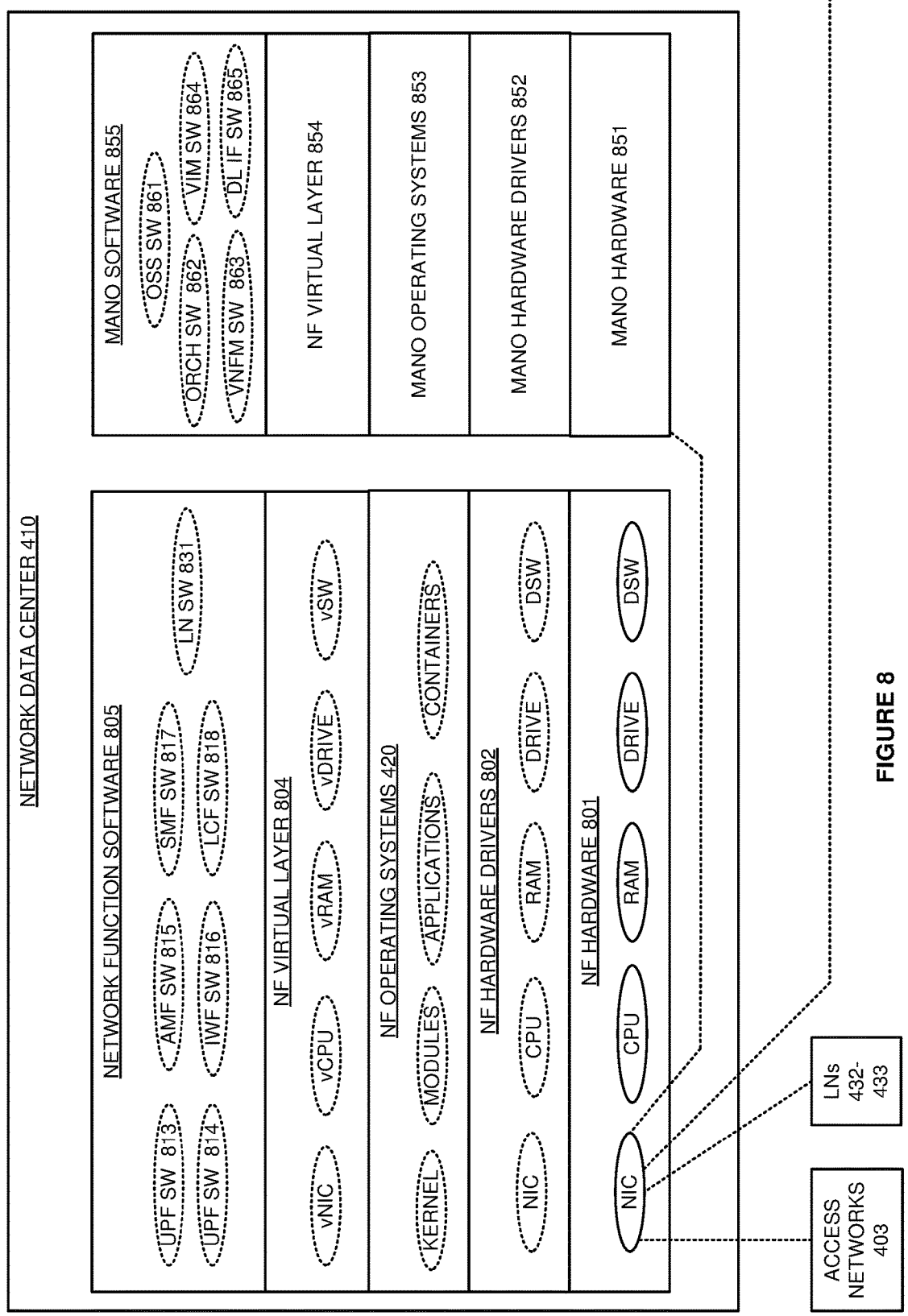
FIG. 8 illustrates an exemplary network data center in the 5G wireless communication network.

FIG. 8 illustrates exemplary network data center 410 in 5G wireless communication network 400. Network data center 410 comprises an example of network and ledger circuitries 112-114, although circuitries 112-114 may differ. Network data center 410 comprises Network Function (NF) hardware 801, NF hardware drivers 802, NF operating systems 803, NF virtual layer 804, and NF Software (SW) 805, Management and Orchestration (MANO) hardware 851, MANO hardware drivers 852, MANO operating systems 420, MANO virtual layer 854, and MANO SW 855. NF hardware 801 comprises Network Interface Cards (NICs), CPU, RAM, Flash/Disk Drives (DRIVE), and Data Switches (DSW). MANO hardware 851 could be similar. NF hardware drivers 802 comprise software that is resident in the NIC, CPU, RAM, DRIVE, and DSW. MANO hardware drivers 852 could be similar. NF operating systems 420 comprise kernels, modules, and applications that form containers for virtual layer and NF software execution. MANO operating systems 853 could be similar. NF virtual layer 804 comprises vNIC, vCPU, vRAM, vDRIVE, and vSW. MANO virtual layer 854 could be similar. NF SW 805 comprises UPF SW 813, UPF SW 814, AMF SW 815, IWF SW 816, SMF SW 817, LCF SW 818, and LNF SW 831. Other NFs like Authentication Server Function (AUSF) and Network Repository Function (NRF) are typically present but are omitted for clarity. MANO SW 855 comprises Operational Support System (OSS) SW 861, Orchestrator SW 862, Virtual Network Function Manager (VNFM) SW 863, Virtual Infrastructure Manager (VIM) SW 864, and Distributed Ledger Interface (DL IF) SW 865. Network data center 410 may be located at a single site or be distributed across multiple geographic locations. The NIC in NF hardware 801 are coupled to access networks 403, LNs 432-433, MANO hardware 851, and external systems. NF hardware 801 executes NF hardware drivers 802, NF operating systems 803, NF virtual layer 804, and NFs 805 to form and operate UPF 411-412, AMF 415, IWF 416, SMF 417, LCF 418, and LN 431. MANO hardware 851 executes MANO hardware drivers 852, MANO operating systems 853, MANO virtual layer 854, and MANO SW 855 to form and operate the following network elements that shown on FIG. 10: Operational Support System (OSS) 1061, Orchestrator 1062, Virtual Network Function Manager (VNFM) 1063, Virtual Infrastructure Manager (VIM) 1064, and Distributed Ledger Interface (DL IF) SW 1065.

Figure 9:
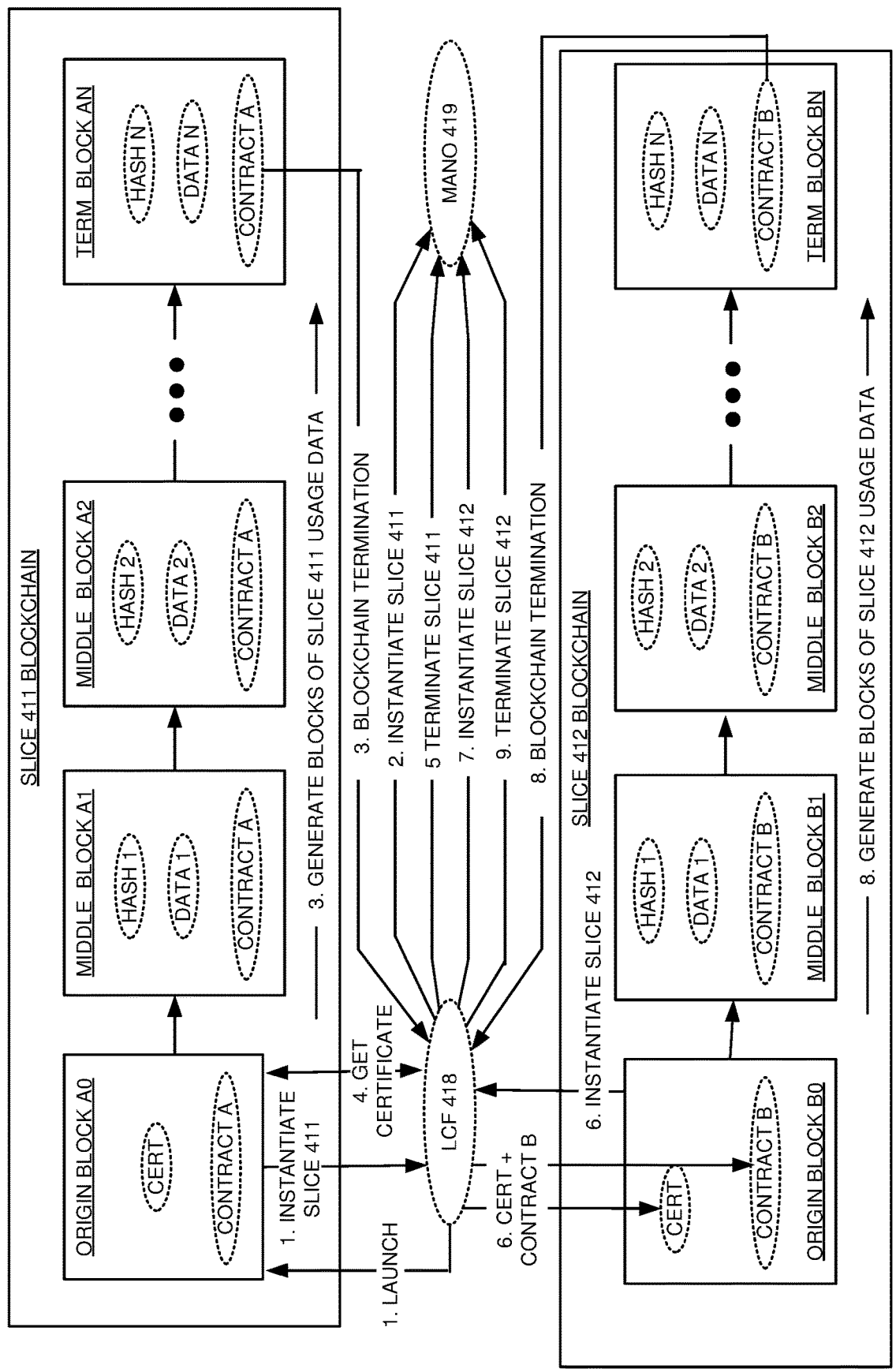
FIG. 9 illustrates an exemplary operation of the 5G wireless communication network to serve the UEs over the wireless network slice controlled by the distributed ledger.

FIG. 9 illustrates an exemplary operation of 5G wireless communication network 400 to serve the UE 401 over wireless network slices 411-412 controlled by distributed ledger 430. The operation may differ in other examples. In a first operation, LCF 418 launches the blockchain for slice 411, and LN 431 executes contract A from origin block A0. LN 431 replicates the execution of origin block A0 across LNs 431-433. The origin block A0 has contract A and a digital certificate (CERT). In response to the execution of contract A, the blockchain for slice 411 directs LCF 418 to instantiate slice 411.

In a second operation, LCF 418 directs MANO 419 to instantiate slice 411 in response to the direction from the blockchain for slice 411. In a third operation, the slice 411 blockchain receives slice 411 usage data and executes contract A to generate middle blocks A1, A2, and so on. Middle block A1 comprises Hash 1 of block A0, Data 1 of slice 411 usage data, and contract A. Middle block A2 comprises Hash 2 of block A1, Data 2 of additional slice 411 usage data, and contract A. Eventually, the slice 411 blockchain executes contract A to generate termination block AN. Termination block AN comprises Hash N of block A(N−1), Data N of slice 411 usage data, and contract A. The blockchain for slice 411 notifies LCF 418 of the blockchain termination. The termination could be triggered by a time amount, usage amount, network status, or some other data made available to contract A.

In a fourth operation, LCF 418 retrieves the digital certificate from origin block A0 in response to the blockchain termination. In a fifth operation, LCF 418 signals MANO 419 to terminate slice 411 in response to the blockchain termination. In a sixth operation, LCF 418 launches the blockchain for slice 412 by transferring the digital certificate and a new contract B to origin block B0. LCF 418 hosts a data structure that correlates the termination of the slice 411 blockchain with instructions for slice 411 termination, new blockchain launch, digital certificate transfer, and new contract retrieval. LN 431 replicates the execution of origin block B0 across LNs 431-433. The origin block B0 has contract B and the digital certificate. In response to the execution of contract B, the blockchain for slice 412 directs LCF 418 to instantiate slice 412.

In a seventh operation, LCF 418 signals MANO 419 to instantiate slice 412 in response to the launch of the slice 412 blockchain. In an eighth operation, the slice 412 blockchain receives slice usage data and executes contract B to generate middle blocks B1, B2, and so on. Middle block B1 comprises Hash 1 of block B0, Data 1 of slice 412 usage data, and contract B. Middle block B2 comprises Hash 2 of block B1, Data 2 of additional slice 412 usage data, and contract B. Eventually, the slice 412 blockchain executes contract B to generate termination block BN. Termination block BN comprises Hash N of block B(N−1), Data N of slice 412 usage data, and contract B. The blockchain for slice 412 notifies LCF 418 of the blockchain termination. In a ninth operation, LCF 418 signals MANO 419 to terminate slice 412 in response to the blockchain termination.

LCF hosts the data structure with termination instructions that include storing a chain link to correlate the slice 411 blockchain with the slice 412 blockchain. For example, a service like ultra-low latency may have all of its blockchains linked by LCF 418 in this manner. The hashes are made of the previous blocks and link the blockchain, but the hashes tend to grow as the blockchain grows. The digital certificate is different from the hashes and does not change or grow. The digital certificate is not a hash of a previous block.

Figure 10:
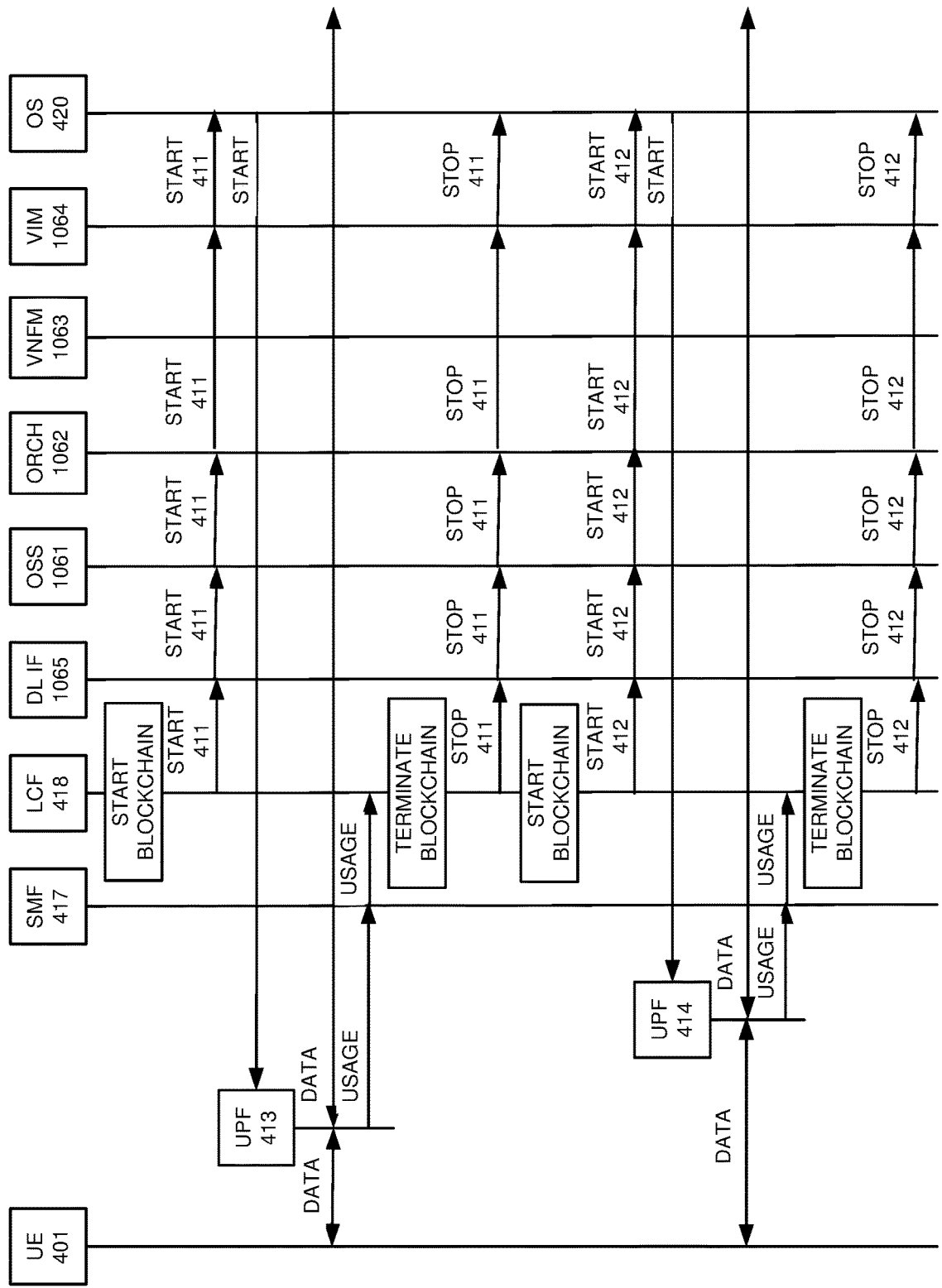
FIG. 10 illustrates an exemplary operation of the 5G wireless communication network to serve the UEs over the wireless network slice controlled by the distributed ledger.

FIG. 10 illustrates an exemplary operation of 5G wireless communication network 400 to serve UE 401 over the wireless network slices 411-412 controlled by distributed ledger 430. The operation may differ in other examples. Initially, slices 411-412 and UPFs 413-414 are not yet instantiated. In addition, network data center 410 executes MANO SW 855 to form and operate OSS 1061, Orchestrator 1062, VNFM 1063, VIM 1064, and DL IF 1065.

LCF 418 starts the blockchain for slice 411 in LN 431, and in response, LCF 418 directs OSS 1061 over DL IF 1065 to instantiate slice 411 and UPF 413 per the specifications. OSS 1061 directs orchestrator 1062 to instantiate slice 411 and UPF 413 per the specifications. Orchestrator 1062 directs VIM 1064 to instantiate slice 411 and UPF 413 per the specifications. VIM 1064 directs OS 420 to instantiate slice 411 and UPF 413 per the specifications. OS 420 loads UPF 413 for execution per the specifications. LCF 418 or VNFM 1063 may direct SMF 417 to load the ID and contact information for UPF 413 and slice 411 into network elements like UDM, NSSF, and NRF. UE 401 and external systems exchange data for slice 411 over UPF 413. Other UEs use slice 413 in a similar manner. UPF 413 transfers the corresponding usage data for slice 411 to SMF 417. SMF 417 transfers the slice usage data to LCF 418 which loads the usage data for slice 411 into the blockchain for slice 411.

Eventually, LCF 418 detects blockchain termination, and in response, LCF 418 directs OSS 1061 over DL IF 1065 to terminate slice 411 and UPF 413. OSS 1061 directs orchestrator 1062 to terminate slice 411 and UPF 413. Orchestrator 1062 directs VIM 1064 to terminate slice 411 and UPF 413. VIM 1064 directs OS 420 to terminate slice 411 and UPF 413. OS 420 unloads UPF 413 from execution. LCF 418 or VNFM 1063 may direct SMF 417 to unload the ID and contact information for UPF 413 and slice 411 from network elements like UDM, NSSF, and NRF.

In response to the blockchain termination, LCF 418 starts the blockchain for slice 412 in LN 431, and in response, LCF 418 directs OSS 1061 over DL IF 1065 to instantiate slice 412 and UPF 414 per the specifications. OSS 1061 directs orchestrator 1062 to instantiate slice 412 and UPF 414 per the specifications. Orchestrator 1062 directs VIM 1064 to instantiate slice 412 and UPF 414 per the specifications. VIM 1064 directs OS 420 to instantiate slice 412 and UPF 414 per the specifications. OS 420 loads UPF 414 for execution per the specifications. LCF 418 or VNFM 1063 may direct SMF 417 to load the ID and contact information for UPF 414 and slice 412 into network elements like UDM, NSSF, and NRF. UE 401 and external systems exchange data for slice 412 over UPF 414. Other UEs use slice 414 in a similar manner. UPF 414 transfers the corresponding usage data for slice 412 to SMF 417. SMF 417 transfers the slice usage data to LCF 418 which loads the usage data for slice 412 into the blockchain for slice 412.

Eventually, LCF 418 detects blockchain termination, and in response, LCF 418 directs OSS 1061 over DL IF 1065 to terminate slice 412 and UPF 414. OSS 1061 directs orchestrator 1062 to terminate slice 412 and UPF 414. Orchestrator 1062 directs VIM 1064 to terminate slice 412 and UPF 414. VIM 1064 directs OS 420 to terminate slice 412 and UPF 414. OS 420 unloads UPF 414 from execution. LCF 418 or VNFM 1063 may direct SMF 417 to unload the ID and contact information for UPF 414 and slice 412 from network elements like UDM, NSSF, and NRF. The operation may repeat with additional blockchains and slices. LCF 418 stores links between these blockchains and may place a common digital certificate in the origin blocks of related blockchains.

The wireless data network circuitry described above comprises computer hardware and software that form special-purpose networking circuitry to serve UEs over wireless network slices controlled by distributed ledgers. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs over wireless network slices controlled by distributed ledgers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless communication device over a wireless network slice using one or more distributed ledger nodes, the method comprising:
   the one or more distributed ledger nodes transferring a slice request for the wireless communication device to a network orchestrator;
   the network orchestrator instantiating the wireless network slice for the wireless communication device responsive to the slice request;
   the wireless network slice transferring user data for the wireless communication device and responsively transferring slice usage data for the wireless communication device to the one or more distributed ledger nodes;
   the one or more distributed ledger nodes storing the slice usage data for the wireless communication device;
   the one or more distributed ledger nodes transferring a termination request to the network orchestrator; and
   the network orchestrator terminating the wireless network slice for the wireless communication device responsive to the termination request.

2. The method of claim 1 further comprising:
   the one or more distributed ledger nodes transferring a new slice request for the wireless communication device to the network orchestrator;
   the network orchestrator instantiating a new wireless network slice for the wireless communication device responsive to the new slice request;
   the new wireless network slice transferring new user data for the wireless communication device and responsively transferring new slice usage data for the wireless communication device to the one or more distributed ledger nodes; and
   the one or more distributed ledger nodes storing the new slice usage data for the wireless communication device.

3. The method of claim 2 further comprising the one or more distributed ledger nodes storing linking data that correlates the slice usage data, the new slice usage data, and the wireless communication device.

4. The method of claim 2 wherein the one or more distributed ledger nodes comprise smart contracts that have a same digital certificate.

5. The method of claim 1 further comprising the one or more distributed ledger nodes generating a slice usage amount for the wireless communication device based on the slice usage data.

6. The method of claim 1 wherein the wireless network slice comprises at least one of a User Plane Function (UPF), an Application Server (AS), and an Internet Protocol Multimedia Subsystem (IMS).

7. The method of claim 1 wherein the wireless network slice transferring the user data for the wireless communication device comprises the wireless network slice transferring the user data for the wireless communication device in response to receiving a slice request from the wireless communication device.

8. A wireless communication network to serve a wireless communication device over a wireless network slice using one or more distributed ledger nodes, the wireless communication network comprising:
   the one or more distributed ledger nodes configured to transfer a slice request for the wireless communication device to a network orchestrator;
   the network orchestrator configured to instantiate the wireless network slice for the wireless communication device responsive to the slice request;

the wireless network slice configured to transfer user data for the wireless communication device and responsively transfer slice usage data for the wireless communication device to the one or more distributed ledger nodes;

the one or more distributed ledger nodes further configured to store the slice usage data for the wireless communication device;

the one or more distributed ledger nodes further configured to transfer a termination request to the network orchestrator; and the network orchestrator further configured to terminate the wireless network slice for the wireless communication device responsive to the termination request.

9. The wireless communication network of claim 8 wherein:

the one or more distributed ledger nodes are further configured to transfer a new slice request for the wireless communication device to the network orchestrator;

the network orchestrator is further configured to instantiate a new wireless network slice for the wireless communication device responsive to the new slice request;

the new wireless network slice is further configured to transfer new user data for the wireless communication device and responsively transfer new slice usage data for the wireless communication device to the one or more distributed ledger nodes; and the one or more distributed ledger nodes are further configured to store the new slice usage data for the wireless communication device.

10. The wireless communication network of claim 9 wherein the one or more distributed ledger nodes are further configured to store linking data that correlates the slice usage data, the new slice usage data, and the wireless communication device.

11. The wireless communication network of claim 9 wherein the one or more distributed ledger nodes are configured to execute smart contracts that have a same digital certificate.

12. The wireless communication network of claim 8 wherein the one or more distributed ledger nodes are further configured to generate a slice usage amount for the wireless communication device based on the slice usage data.

13. The wireless communication network of claim 8 wherein the wireless network slice comprises at least one of a User Plane Function (UPF), an Application Server (AS), and an Internet Protocol Multimedia Subsystem (IMS).

* * * * *